June 2, 1964     F. W. BAUMANN     3,135,879
LINEAR MOTOR
Filed Aug. 4, 1958
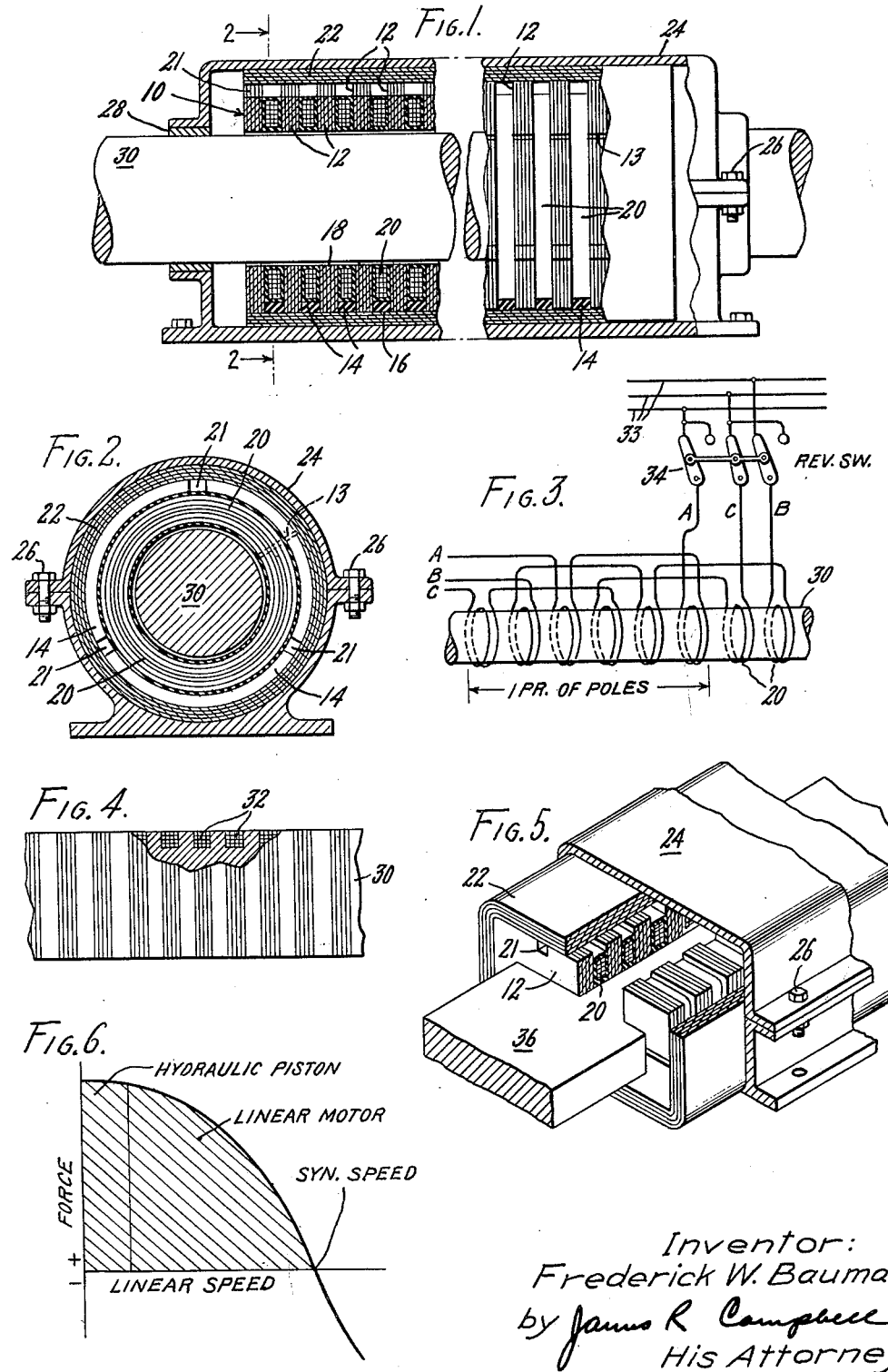
Inventor:
Frederick W. Baumann
by James R. Campbell
His Attorney

3,135,879
LINEAR MOTOR

Frederick W. Baumann, Scotia, N.Y., assignor to General
Electric Company, a corporation of New York
Filed Aug. 4, 1958, Ser. No. 752,859
6 Claims. (Cl. 310—13)

The invention described herein relates to dynamoelectric machines and more particularly to a linear motor having its armature adapted for movement axially by the flux established by an energized winding in the stator portion of the machine.

The linear motor generally consists of a stator or primary member enclosing a secondary or armature which is caused to move axially when linked by flux, in much the same manner as the plunger of a solenoid. Its physical action therefore, is similar to a tractive electromagnet since its armature moves through a distance to do work, but the means employed in obtaining such movement utilizes the structure and principles involved in operation of dynamoelectric machines. The similarity between the linear motor and other electrical equipment, such as synchronous, induction or direct current motors and generators, is that the stator carries the flux-producing primary conductors which move the armature in a linear, rather than circumferential direction. The stator slots however extend perpendicularly to that conventionally found in rotating equipment, but the primary winding is secured therein in the same manner. Likewise, the secondary may be equipped with a winding the electrical equivalent of that found in the rotating machines.

The linear motor has not met wide acceptance because of the simplicity and general effectiveness of other systems providing motive power, such as hydraulic systems. Recent developments in the latter have resulted in the permissive application of very high pressures to a piston having a shaft extending to a device adapted for actuation. A primary objection to hydraulic and other mechanical systems however, is that they are not capable of moving a slidable member with a speed approaching that of a linear motor. As indicated in FIGURE 6 of the drawing, the maximum attainable speed of a hydraulic piston is a fraction of the speed capable of being achieved by an armature of a linear motor. In applications where relatively high speed is a necessary requisite to successful operation of a system, it is evident that a linear motor may be the preferred type of power actuation device.

Those known disclosures relating to linear motors include launchers, oscillating ball conveyors, and the like, but the motors for these installations have been designed for very specific applications without regard to incorporating features therein to permit general use in a wide variety of applications.

It therefore is an object of my invention to provide a linear motor of reliable, simple and economical design capable of providing high armature speeds while still retaining a degree of flexibility to permit general use in different types of installations.

In carrying out my invention, I provide a stator core consisting of a plurality of groups of laminations wherein adjacent groups are spaced from each other axially by insulating spacers having a greater inner diameter than the laminations. The conductors of a primary winding of toroidal form are wound or positioned in the cavity thus formed by walls of adjacent groups of laminations and the inner surface of the spacers so that upon energization of the winding, flux flows linearly rather than in a circumferential direction. In order to reduce the effects of circulating currents in the stator core, each group of laminations is split to form less than a complete circle, thus limiting parasitic current flow in the machine. A rolled laminated yoke surrounds the stator for reducing eddy current losses and an outer casing is pressed over the yoke to furnish structural support to the whole assembly. The armature also may be equipped with toroidal-shaped secondary conductors or short-circuited squirrel cage rings or the armature may be of hollow or solid construction. When conductors of any type are installed on the movable secondary member, they serve to react with the flux supplied by the primary winding as in the case of dynamoelectric machines. Suitable bearings are mounted on the frame for facilitating movement of the armature axially of the stator and appropriate connections are applied to the ends of the armature for permitting connection to a device adapted for actuation.

While the specification concludes with claims particularly pointing out and distinctly claiming the subject matter which I regard as my invention, it is believed the invention will be better understood from the following description taken in connection with the accompanying drawing in which:

FIGURE 1 is a view in elevation, partly in section, illustrating the arrangement of primary and secondary conductors in a linear motor;

FIGURE 2 is a view taken on lines 2—2 of FIGURE 1;

FIGURE 3 is a diagrammatic illustration of the primary winding encompassing a movable secondary member;

FIGURE 4 is a view in elevation, partly in section, showing the disposition of laminations and a secondary winding installed on the armature for the linear motor;

FIGURE 5 is a modification with parts broken away illustrating the arrangement and configuration of parts when a rectangular-shaped secondary is used in the motor; and FIGURE 6 is a force versus speed curve illustrating the relationship of linear speeds of a piston in a hydraulic system and the armature of a linear motor.

Referring now to the drawing wherein like reference characters designate like or corresponding parts throughout the several views, there is shown in FIGURES 1 and 2, a stator core 10 comprising a plurality of groups of laminations 12, each group consisting of steel washers split at 13 and insulated from each other by an oxide or enamel coating. The washers are assembled on a mandrel and each group of adjacent laminations is spaced each other by a spacer member 14 of insulating material having a diameter 16 greater than the inner diameter 18 of the laminations. The cavity thus formed by the walls of adjacent laminations and the inner surface of the spacers is of sufficient size to receive a primary winding comprising insulated conductors 20 insulated from the stator core and located adjacent the air gap for the machine. Slots 21 in laminations 12 carry conductor leads to a point remote from the machine. A rolled laminated yoke 22 is wrapped around the mandrel supported washers or laminations. It is continuous throughout its length and extends the complete length of the stator member as shown in FIGURE 1. This assembly is then enclosed in a frame 24 pressed or otherwise formed around the yoke 22 to provide an integral structure. Alternatively, the frame may be divided into halves and secured in position by bolts 26 as illustrated in FIGURE 1.

Bearings 28 are mounted in each end of the machine to support an armature or secondary member 30 adapted for reciprocating movement therein. The armature may assume a cylindrical, rectangular or curved configuration and may be hollow, solid or equipped with circumferential grooves for receiving a secondary winding effective in carrying current, producing force and reacting with the flux established by the primary winding in the machine. In the preferred form, the armature comprises a plurality of stacked laminations made in somewhat the same manner as the stator except that the washers preferably are not interrupted by spacers. The armature is equipped with ring conductors 32 of toroidal shape as shown in FIGURE 4. The secondary winding may be separately excited as in a synchronous or direct current motor by connecting the conductor rings to sliding contactors or to a commutator, or the ring conductors may be short-circuited in the same manner as a squirrel cage rotor.

As illustrated diagrammatically in FIGURE 3, where only slightly more than one pair of poles is shown, the primary winding is designed for polyphase arrangement with 60° phase belts being shown, thereby providing one coil per pole, per phase and three phases. In order to avoid end effects, a plurality of pairs of poles may be used, preferably eight in number. Power for the primary winding is taken from 220 volt, 3 phase, 60 cycle power lines 33 and is connected through a switching arrangement 34, which is designed to reverse phases B and C to obtain forward-reverse movement of the armature. The switch contactors connect phases A, B and C with the corresponding phases in the machine in a conventional manner, and as diagrammatically shown in FIGURE 3. When the primary winding is excited, flux crosses the air gap and enters the secondary or armature under one pole and leaves the secondary under the next pole. Three-phase power in this type of winding distribution, will give the flux a linear motion, and at a speed fixed by the same considerations which establish the speed of the magnetic field in an ordinary polyphase induction motor. With 60 cycle power, the flux will move over one pair of poles in $\frac{1}{60}$ of a second. As the flux moves, it induces a voltage in the secondary which establishes current flow therein in such a way as to oppose the flux provided by the primary winding. Thus, by induction, a force is produced on the secondary in a value commensurate with the flux density resulting from current flow in the primary winding. If the secondary is free to move, force will be a function of speed in much the same manner as torque is a function of speed in a polyphase induction motor. FIGURE 6 illustrates a synchronous speed curve resulting from a plot of force versus linear speed in a machine of the type described herein.

It has been found that such a linear motor equipped with a three-phase primary winding and having a plurality of toroidal conductors spaced along the length and positioned in the peripheral surface of the armature, will produce a stalled thrust in the secondary of 230 lbs. where the outside diameter of the stator is approximately four inches, a bore of two inches and a length of electrical parts of 11.3 inches. A stalled thrust of 37 lbs. is obtainable with a secondary made either of solid or hollow material and without any conductors in its peripheral surface. The synchronous speed of such a device is 14.2 feet per second with 60 cycle, 3 phase, 220 volt power. The characteristics inherent in this type linear motor are different from other available devices providing linear motion in that its movement is restricted only by the length of the secondary member. It can be reversed in the direction of its force by interchanging two of the leads by a switching arrangement as indicated at 34 in the drawing. The stator of such a motor would weigh in the neighborhood of 30 lbs. Compared to a rack and piston in a hydraulic system, the linear motor offers mechanical simplicity, reliability, freedom from wear and higher speeds. Its movement is relatively unrestricted and its control less complicated. It is capable of a higher order of reliability compared to a solenoid because of the elimination of a hammering action prevalent in tractive electromagnets.

As indicated in FIGURE 6, the obtainable speed is much greater than that available from hydraulic actuable devices. As indicated in the preceding paragraph, the armature speed of the motor described is 14.2 feet per second. The curve shows that maximum force for both the hydraulic device and the linear motor is generated when the movable elements are first actuated. As the speed increases, assuming the application of constant energy to the elements, the generated force remains about the same until the upper permissible speed for the hydraulic device is reached. Since the linear motor speeds are much greater, the curve shows that force drops off almost linearly until the synchronous speed is reached, where the force or torque, becomes zero. It will be apparent to those skilled in the art that the shape of the curve may be changed since the same principles applicable to squirrel cage motor design apply in this case. Where solid steel armatures are used, the actual maximum generated force will occur back of standstill and this of course is attributable to the relatively high resistance offered by the solid magnetic core. Obviously if copper rings were used on the core, the maximum force could be chosen to occur some place between standstill and synchronous speed.

The modification illustrated in FIGURE 5 is much the same as that previously described except that the laminations are stamped to provide a central opening of rectangular configuration for receiving a solid bar of steel 36 shaped to a rectangular configuration. Obviously, conductors also may be incorporated in the secondary. Design and operation of the machine in the modified form of the invention is similar to that previously described.

In view of the above, it would be evident that modifications and variations are possible in light of the above teachings. It therefore is to be understood that within the scope of the appended claims, the invention may be practiced otherwise than as specifically described.

What I claim as new and desire to secure by Letters Patent of the United States is:

1. A linear motor comprising a primary member having a winding therein including conductors positioned between spaced groups of laminations, a laminated yoke surrounding the primary member for limiting the amplitude of circulating currents therein and a shell encompassing the laminated yoke, an armature centrally positioned within the primary member and having ends extending through opposite ends of the shell so that upon energization of the primary winding, flux enters the secondary member to create a force sufficient to move the armature linearly at a speed which is a function of the frequency and spacing of poles provided by the primary winding.

2. A linear motor comprising a primary member including a plurality of groups of laminations spaced from each other along their axial length, each of the laminations in said group being split to form less than a complete circle and thereby limit the extent of circulating currents in the magnetic laminated member, a separate spacer having a diameter greater than the laminations positioned between each adjacent group, and a primary winding comprising conductors positioned in the space provided by adjacent walls of the laminations and the inner peripheral surface of the spacers, a rolled laminated yoke wound circumferentially around the primary member and a frame pressed over the laminated yoke to provide a compact assembly, an armature centrally positioned within a bore provided by said laminations and spacers and movable linearly thereof when subjected to the flux forces produced when the primary winding is energized.

3. A linear motor comprising a primary member including a plurality of groups of laminations spaced from each other along their axial length, each of the laminations in said groups being split to form less than a complete circle and thereby limit the extent of circulating currents in the magnetic laminated core, an insulated spacer having an inner diameter greater than the inner diameter of the laminations positioned between each adjacent group, a primary winding comprising conductors positioned in the space provided by adjacent walls of the laminations and the internal peripheral surface of the spacers, a rolled laminated yoke wound circumferentially around the primary member and a frame pressed over the laminated yoke to provide a compact assembly, said primary winding comprising conductors wound in three-phase arrangement, an armature centrally positioned within the bore provided by the groups of laminations and spacers and mounted to permit movement in a direction axially of the primary member, and means in said secondary member responsive to the flux produced by the primary winding for facilitating movement of the armature in a linear direction and at a speed which is a function of the frequency and spacing of poles in the primary winding.

4. The combination according to claim 3 wherein the secondary of said motor comprises an armature equipped with squirrel cage rings for permitting movement in an axial direction.

5. A linear motor comprising a plurality of laminations split along their circular length and joined to form a stator, conductor slots in said stator disposed concentric with the stator axis for receiving a polyphase winding, openings extending axially in the laminations for containing conductor leads for said winding, a rolled laminated yoke encompassing the primary member and a frame pressed on the outer peripheral surface of the yoke, an armature centrally positioned within a bore of the primary member and having ends projecting through openings in opposite sides of the frame for permitting movement linearly of the primary member, and a secondary winding having conductors of toroidal configuration positioned near the exterior surface of the armature to be separately energized from a power source, so that upon energization of the primary and secondary windings a resultant flux is produced capable of moving the armature in the same direction as the flux and at a speed which is a function of the frequency and spacing of poles in the primary winding.

6. The combination according to claim 5 wherein a switch is positioned between a three-phase power source and the primary winding in the motor and having its contactors arranged for reversing any two of the three phases for permitting armature movement in a forward-reverse direction.

References Cited in the file of this patent

UNITED STATES PATENTS

| | | |
|---|---|---|
| 782,312 | Zehden | Feb. 14, 1905 |
| 1,754,685 | Kanter | Apr. 15, 1930 |
| 1,912,167 | Anderson | May 30, 1933 |
| 2,803,761 | Young | Aug. 20, 1957 |

FOREIGN PATENTS

| | | |
|---|---|---|
| 10,618 | Norway | Feb. 24, 1900 |
| 285,089 | Great Britain | May 10, 1929 |